US 12,254,245 B2

United States Patent
Oh et al.

(10) Patent No.: US 12,254,245 B2
(45) Date of Patent: Mar. 18, 2025

(54) METHOD OF PROCESSING DIGITALIZED DRAWING DATA AND COMPUTER PROGRAM

(71) Applicant: SAMSUNG E&A CO., LTD., Seoul (KR)

(72) Inventors: Dong Yong Oh, Seoul (KR); Jung Ho Chang, Seoul (KR); John Roby, Seoul (KR); Sang Do Kim, Seoul (KR)

(73) Assignee: SAMSUNG E&A CO., LTD., Seoul (KR)

(*) Notice: Subject to any disclaimer, the term of this patent is extended or adjusted under 35 U.S.C. 154(b) by 0 days.

(21) Appl. No.: 18/279,469

(22) PCT Filed: Sep. 15, 2022

(86) PCT No.: PCT/KR2022/013825
§ 371 (c)(1),
(2) Date: Sep. 12, 2023

(87) PCT Pub. No.: WO2024/014616
PCT Pub. Date: Jan. 18, 2024

(65) Prior Publication Data
US 2024/0020435 A1 Jan. 18, 2024

(30) Foreign Application Priority Data

Jul. 15, 2022 (KR) .................. 10-2022-0087736

(51) Int. Cl.
*G06F 30/18* (2020.01)
*G06F 30/12* (2020.01)
*G06F 113/14* (2020.01)

(52) U.S. Cl.
CPC .............. *G06F 30/18* (2020.01); *G06F 30/12* (2020.01); *G06F 2113/14* (2020.01)

(58) Field of Classification Search
CPC ....................................................... G06F 30/18
(Continued)

(56) References Cited

U.S. PATENT DOCUMENTS

2019/0377836 A1 12/2019 Metzler et al.
2020/0175211 A1* 6/2020 Kang .................... G06F 30/23
2020/0410142 A1 12/2020 Hori et al.

FOREIGN PATENT DOCUMENTS

CN 112597603 A * 4/2021 ............ G06F 30/17
KR 19990066224 A 8/1999
(Continued)

OTHER PUBLICATIONS

Gao et al, "Component Detection in Piping and Instrumentation Diagrams of Nuclear Power Plants Based on Neural Networks", Department of Mechanical and Aerospace Engineering, Nuclear Engineering Program, The Ohio State University, https://www.sciencedirect.com/science/article/pii/S0149197020302419, published 2020, 51 pgs.

(Continued)

*Primary Examiner* — Eric D Lee
(74) *Attorney, Agent, or Firm* — Panitch Schwarze Belisario & Nadel LLP

(57) ABSTRACT

Disclosed are a method of processing digitalized drawing and a compute program. One aspect of the present invention provides a method of processing digitalized drawing data by a computer, the method including: providing digitalized drawing having a line ID (S10); splitting the line ID into a plurality of topologies, which are smallest units that are mutually exclusive and do not overlap each other (S20); generating a pipe system network (PSN) by recombining the plurality of topologies, wherein the plurality of topologies are recombined such that a start point and an end point of the PSN are each independently Equipment, Branch or Header (S30); and generating a path item (PI) by arranging internal
(Continued)

objects on the digitalized drawing existing between the start point and the end point of the pipe system network (PSN) and adding necessary information usable in a subsequent process (S40).

16 Claims, 12 Drawing Sheets

(58) Field of Classification Search
USPC .............................................................. 703/1
See application file for complete search history.

(56) References Cited

FOREIGN PATENT DOCUMENTS

| KR | 20150049805 | A | | 5/2015 | | |
|---|---|---|---|---|---|---|
| KR | 2020065613 | A | * | 6/2020 | ............. | G06F 30/12 |
| KR | 2020086847 | A | * | 7/2020 | ............. | G06F 30/00 |
| KR | 20200086847 | A | | 7/2020 | | |
| KR | 2020097953 | A | * | 8/2020 | ........... | G06F 3/0481 |
| KR | 20200097953 | A | | 8/2020 | | |
| KR | 2244099 | B1 | * | 4/2021 | ............. | G06F 30/18 |
| KR | 102244099 | B1 | | 4/2021 | | |
| KR | 2285953 | B1 | * | 8/2021 | ............. | G06F 30/18 |
| KR | 102285953 | B1 | | 8/2021 | | |

OTHER PUBLICATIONS

Rahul et al, "Automatic Information Extraction from Piping and Instrumentation Diagrams", TCS Research, New Delhi, India, Jan. 28, 2019, 10 pgs.

International Search Report and Written Opinion, dated Apr. 10, 2023, issued in corresponding International Application No. PCT/KR2022/013825, 9 pgs.

* cited by examiner

FIG. 1

| Line ID | Unit | Fluid | Line | Piping Material Class | Pipe Size | From | To |
|---|---|---|---|---|---|---|---|
| 1"-DC-26-046-A03A-N | 100 | FW | 0046 | Z03B | 2" | 12"-PG-100-0046-Z03B-N | 2"-P-200-0043-Z01C-N |

| Operating Max. Pressu | Operating Max. Temperatu | Design Max. Pressu | Design Max. Temperatu | Liq. Vap. | Insulation Thickness | P & ID Name | |
|---|---|---|---|---|---|---|---|
| XXX | YYY | ZZZ | AAA | BBB | CCC | XXXX-100-DC-C-YYYYY | |

FIG. 4

| Pipe Systems (75) | | | | |
|---|---|---|---|---|
| System ID | System Name | Fluid | Materials Class | PipeLines |
| AI-1D1A2 | Instrument air | AI | 1D1A2 | 34 nos |
| AI- | Instrument air | AI | | |
| AI-1D1A2 | SERVICE AIR | AS | 1D1A2 | 20 nos |
| CM-1A1A1 | CHEMICAL INJ (METHANOL) | CM | 1A1A1 | 11 nos |
| CM-9A1A1 | CHEMICAL INJ (METHANOL) | CM | 9A1A1 | 8 nos |
| CM-9J0A1 | CHEMICAL INJ (METHANOL) | CM | 9J0A1 | 1 nos |
| DC- | CLOSED DRAIN | DC | | 0 nos |
| DC-1A1A1 | CLOSED DRAIN | DC | 1A1A1 | 5 nos |
| DC-1A3A1 | CLOSED DRAIN | DC | 1A3A1 | 74 nos |
| DC-6A3A3 | CLOSED DRAIN | DC | 6A3A3 | 1 nos |
| DC- | CLOSED DRAIN | DC | | |
| DO-1A1A1 | OPEN DRAIN (NON-HAZARDOUS) | DO | 1A1A1 | 7 nos |
| FD-1A1A1 | DIESEL FUEL | FD | 1A1A1 | 19 nos |
| FG-1A1A1 | FUEL GAS | FG | 1A1A1 | 15 nos |
| FG-1B1A3 | FUEL GAS | FG | 1B1A3 | 1 nos |

FC — Fluid Code

PMC — Piping Materials Class

FIG. 5

| Pipe Lines (841) | | | | | | |
|---|---|---|---|---|---|---|
| PipeRuns | | | | | | |
| PipeLine ID | Pipe System | Fluid | PMC | Seq Nbr | Insl | Unit |
| PG-9J0A1-002-C | PG-9J0A1 | PG | 9J0A1 | 002 | C | 32 |
| PG-9J0A1-002 | PG-9J0A1 | PG | 9J0A1 | 002 | | 32 |
| PG-9J0A1-003-C | PG-9J0A1 | PG | 9J0A1 | 003 | C | 32 |
| PG-9J0A1-008-C | PG-9J0A1 | PG | 9J0A1 | 008 | C | 32 |
| PG-9J0A1-009-C | PG-9J0A1 | PG | 9J0A1 | 009 | C | 32 |
| PG-9J0A1-012-C | PG-9J0A1 | PG | 9J0A1 | 012 | C | 32 |
| PG-9J0A1-056-C | PG-9J0A1 | PG | 9J0A1 | 056 | C | 32 |
| PG-9J0A1-057-C | PG-9J0A1 | PG | 9J0A1 | 057 | P | 32 |
| PL-1A1A1-004-P | PL-1A1A1 | PL | 1A1A1 | 004 | | 45 |
| PL-1A1A1-019 | PL-1A1A1 | PL | 1A1A1 | 019 | | 43 |
| PL-1A1A1-023 | PL-1A1A1 | PL | 1A1A1 | 023 | | 33 |
| PL-1A1A1-049 | PL-1A1A1 | PL | 1A1A1 | 049 | | 33 |
| PL-1A1A1-050 | PL-1A1A1 | PL | 1A1A1 | 050 | | 33 |
| PL-1A1A1-051 | PL-1A1A1 | PL | 1A1A1 | 051 | | 33 |

FC    Fluid Code

PMC    Piping Materials Class

SN    Tag Sequence Number

NPD    Nominal Diameter

IN    Insulation Purpose / Req.

METHOD OF PROCESSING DIGITALIZED DRAWING DATA AND COMPUTER PROGRAM

TECHNICAL FIELD

A method of processing digitalized drawing data and a computer program are disclosed. More specifically, disclosed are a digital drawing data processing method of processing digitalized drawing data into a form of data that can be utilized in quantity calculation and an automatic 3D model generation, and a computer program.

BACKGROUND ART

In the prior art, as illustrated in FIG. 1, by manually reviewing P & ID (piping and instrumentation diagram) a person has to classify pipes according to certain standards and group the classified pipes together according to certain standards, to make a line list. However, since such a method is done by hand, it takes a long time to work, and there is a problem in that a large number of work errors (human errors) occur.

Carefully examining the prior art method of making a line list shows that a line list is made generally through the process of splitting each line by using 'NPD (nominal pipe diameter)', 'fluid code', 'piping material code', 'sequence number', 'unit number', 'insulation code', etc. as key values. However, when a line is classified based on only such key values, as shown in FIG. 2, it is difficult to classify the P & ID information into individual lines in which the start point or the end point do not overlap.

Therefore, it is impossible to apply the conventional configuration scheme to a 3D pipe automatic routing system that operates based on a line with unique start and end points due to the non-compliance with the following requirements:
(1) Unique lines are essential to determining accurate connection points.
(2) Unique lines are essential to specify the object (input value) to be routed in software (S/W).

DISCLOSURE OF INVENTION

Technical Problem

One embodiment of the present invention provides a method of processing digitalized drawing data, which can process digitalized drawing data into a form of data that can be utilized in quantity calculations and 3D modeling.

Another embodiment of the present invention provides a computer program stored in a computer-readable recording medium, for executing the method of processing digitalized drawing data by using a computer.

Solution to Problem

One aspect of the present invention provides a method of processing digitalized drawing data by a computer, the method including: providing digitalized drawing having a line ID (S10); splitting the line ID into a plurality of topologies, which are smallest units that are mutually exclusive and do not overlap each other (S20); generating a pipe system network (PSN) by recombining the plurality of topologies, wherein the plurality of topologies are recombined such that a start point and an end point of the PSN are each independently Equipment, Branch or Header (S30); and generating a path item (PI) by arranging internal objects on the digitalized drawing existing between the start point and the end point of the pipe system network (PSN) and adding necessary information usable in a subsequent process (S40).

In the step (S10), the line ID may include fluid code (PC), piping material class (PMC), sequence number (SN), unit number (UN), insulation code (IC), or a combination thereof.

The step (S20) may include the following steps:
generating a pipe system (PS) by combining the fluid code (FC) and the piping material class (PMC) (S20-1);
generating a pipe line (PL) by combining the pipe system (PS) and the sequence number (SN) (S20-2);
generating a topology by combining the pipe line (PL) and the insulation code (IC) and classifying the resultant by the unit number (UN) (S20-3);
adding a sub-type tag to the topology generated in the step (S20-3) according to a predetermined standard (S20-4); and
classifying the topology generated in the step (S20-4) as main or branch according to a predetermined standard (S20-5).

In the step (S20-2), the start point and the end point of the pipe line (PL) may be connected to equipment (Equipment) or line break (LB) or may be self-terminated without being connected to anything.

In the step (S20-5), if a plurality of main topologies or branch topologies exist in the same pipeline (PL), the number at the end of each tag may be increased by one such as main (Mi) (i=0 or a positive integer) and branch (Bi) (i=a positive integer).

In the step (S20-5), among the topologies, those connected to equipment are first classified as main, and among the topologies that are not connected to equipment, one of lines whose sub-type is Normal may be randomly classified as Main while the other topologies are classified as Branch.

The sub-type tags may be Normal, Instrument, Vent_Drain, By-pass, Header, or Other system.

In the step (S30), when configuring the pipe system network (PSN), the topologies whose sub-type is Instrument or Vent_Drain may not be used.

The method of processing digitalized drawing may further include, between the step (S30) and the step (S40), the step of adding a type tag to the pipe system network (PSN) (S32), wherein the type tag may include equipment-to-equipment (E2E), equipment-to-branch (E2B), branch-to-equipment (B2E), branch-to-branch (B2B), header-to-equipment (HDE), header-to-branch (HDB), or header-to-header (HD2).

The method of processing digitalized drawing may further include, between the step (S30) and the step (S40), the step of adding an order number (ON) tag to the pipe system network (PSN) (S34), wherein the order number (ON) tag is added to the pipe system network (PSN) so as to correspond in one-to-one fashion to individual pipelines (PL) in the order from the start point to the end point as much as the number of pipelines (PL) (S34).

In the step S40, the path item (PI) may be configured by assigning an order number to each item name existing between the start point and the end point of the pipe system network (PSN) according to the flow direction of the digitalized drawing.

The item names may include branch (Branch), pipe run (PipeRun), piping component (PipingComp), or in-line instrument (Instrument). In addition, the instrument (Instrument) may be located in-line or may be located separately outside the line, and the instrument located outside the line is classified as a separate topology type and not included in the configuration of the pipe system network (PSN), whereas the instrument located in-line is included in the topology.

In the step S40, the path item (PI) may start with a new order number "0" when the topology (ID) is changed in the same pipe system network (PSN).

The method of processing digitalized drawing data may further include, after the step (S40), the step of adding Branch Topology ID tag to the path item (PI) (S42).

In the step (S42), the Branch topology ID may be denoted as the counterpart topology ID that is not included in the corresponding path item (PI) among two topology IDs connected to the T intersection when two different topologies are branched in a tee (T) shape.

The method of processing digitalized drawing data may further include, after the step (S40), the step of adding a pipe system network (PSN) ID tag to the path item (PI) (S44).

In the step (S44), the pipe system network (PSN) ID may be denoted as the ID of the pipe system network (PSN) that includes the counterpart topology that is not included in the corresponding path item (PI) among two topology IDs connected to the T intersection when two different topologies are branched in a tee (T) shape, and in other cases, the pipe system network (PSN) ID may be denoted as the ID of the pipe system network (PSN) that includes the topology that is included in the corresponding path item (PI).

Another aspect of the present invention provides a computer program stored in a computer-readable recording medium in order to execute the method of processing digitalized drawing data by using a computer.

Advantageous Effects of Invention

A method of processing digitalized drawing data according to an embodiment of the present invention has the following advantages:

Data establishment and organization: By extracting the entire piping information of a digitalized drawing into a unit having a start point and an end point, the extracted data can be utilized in other systems.

Reduction of Human Error: The program can automatically extract the piping line list in the pipe system network (PSN) form, which was previously arranged/calculated manually by a human.

Time saving: Time taken to extract the piping line list in the pipe system network (PSN) form can be reduced.

Increased usability: Because the processed drawing data is organized according to a set rule, it is easy to use them in other systems and can be utilized for other purposes (e.g., quantity calculation of valves, reducers, etc. through Path Item inquiry)).

Establishment of standard information: Since standards such as pipe system network (PSN) and path items are organized, they can be used as an information exchange unit with other systems (for example, other systems recognize or transmit information based on PSN).

BRIEF DESCRIPTION OF DRAWINGS

FIG. 1 shows a prior art line list.

FIG. 4 shows an example configuration of a pipe system (PS).

FIG. 5 shows an example configuration of a pipe line (PL).

MODE FOR THE INVENTION

Figure 2:
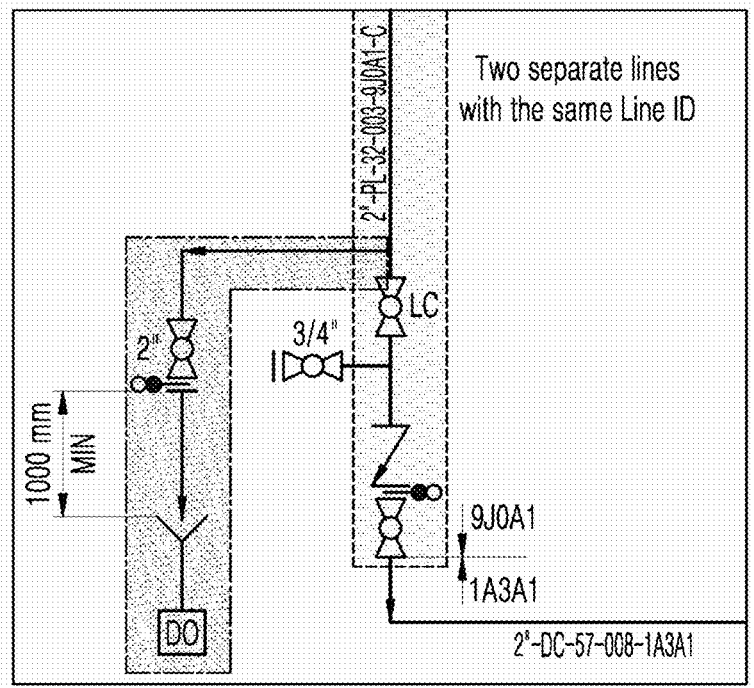
FIG. 2 shows a case in which lines cannot be uniquely split only by line ID in the P & ID drawing.

Hereinbelow, with reference to the drawings, a method of processing digitalized drawing data and a computer program according to an embodiment of the present invention will be described in detail.

As used herein, the term "digitalized drawing" refers to drawings stored in computer-readable recording media, such as P & ID (Piping and Instrumentation diagram) or SPPID (Smart Plant P & ID).

As used herein, the term "equipment" refers to a pump, a vessel, a compressor, a motor, or the like.

As used herein, "line break (LB: Line Break)" is a term referring to dividing a line according to standards such as a pipe material, an internal fluid type, or an internal fluid state.

As used herein, the term "ID (identification)" refers to identification information.

As used herein, the term "pipe run" refers to a single pipe.

As used herein, the term "by-pass" refers to a sub-type of topology wherein the start point and the end point exist on the same pipe line (PL). However, even when the pipe line (PL) at the start point and the pipe line (PL) at the end point are different, subtypes of the topology of the pipelines (PL) connected to the pipeline (PL) at the former part of a specific object (e.g. Pressure Relief Valve, Safety Valve, or Control Valve, etc.) and the pipeline (PL) at the latter part of the specific object are also included in the bypass. For example, in this specific object, the internal fluid of the incoming and outgoing tines of a valve may undergo a pressure change or the like, and as a consequence (i) the head-side and tail-side fluids are often, process-wise, recognized as a different fluid code, which results in a pipeline (PL) number change (e.g., vapor→liquid), and (ii) even if the head-side and the tail-side fluid pressures do not change enough to change the fluid code, the piping material (PMC) may be changed to withstand such fluid pressure change. In other words, the head-side or tail-side pipeline number is changed based on the former part or the latter part of the valve. As such, as the fluid code or pipe material (PMC) is changed, pipe system (FS: F/C PMC) and pipeline (PL: pipe system+SEQ NO), which are based on the fluid code or pipe material (PMC), are changed.

As used herein, "sub-type tag of topology" may be Normal, Instrument, Vent_Drain, By-Pass, Header, or Other System.

In addition, in the present specification, definitions and explanations of other terms other than the above-mentioned terms are described in Table 1 below.

TABLE 1

| Terms | Definitions and descriptions |
|---|---|
| Pipe System | Unit classified by Fluid Code and Piping Material Class (FC-PMC) |
| Pipe Line or PipeLine (PL) | Unit classified by "Pipe System" + Sequence Number (FC-PMC-SN) |
| Topology | A state in which a PipeLine is split in the smallest unit according to the role and configuration of pipe. To create a unique value, after classifying by Unit Number, the line is divided based on the PipeLine + Inslusion code value, and additional tags are attached according to each purpose (attach Tag according to Main and Branch, and then attach a number)<br>Examples of configuration-based purpose: Branches, From-To data, components, By-pass, Drain/Vent, etc.<br>Examples of actual topology: PG-9J0A1-001-C-M0 (=FC-PMC-SN-IN) |
| PSN (Pipe System Network) | A combination of topologies connected to have a unique set of a start point and an end point. An input value unit in Auto Routing Systems. |
| PSN Types | E2E, E2B/B2E, B2B, HDE, HDB, HD2 |
| Path Item | Individual elements constituting the piping line for each PSN (provided by arranging individual elements in order from the start point to the end point according to the fluid direction) |
| From/To | Objects connected to start point and end point of Pipe System Network (PSN) (e.g., Equipment tag, Component Item tag, connected Pipe Line, etc.) |
| Head/Tail | |
| Sequence Number | Characters assigned to distinguish lines from one another on digitalized drawings, generally expressed as numerical digits alone or in combination with letters. |
| Unit Number | Characters assigned according to a specific purpose (process separation, geographical space segmentation, etc.) |
| Insulation Code | Characters assigned to distinguish an insulation on the digital drawing or to indicate the necessity of the insulation when insulating the pipe for the purpose of reserving its warmth/coldness, |
| Component | Smallest objects serving as the unit of data on digitalized drawings. For the range, see examples below. The following examples show part of whole components.<br>Lines: Piperun, Electrical signal, Software signal, Pneumatic, etc.<br>Valves: Ball, Butterfly, Gate valve, etc.<br>In-line items: Reducer, etc.<br>Off-line items: Logic Tag, System function, etc.<br>Equipments: Pump, Vessel, Compressor, Motor, etc.<br>Fittings: Flange, Cap, Spacer, Spectacle, etc.<br>Specialty item: Flexible hose, Silencer, Strainer, etc. |
| Difference in definition between Branch in topology and Branch in PSN type (B2B) | Each definition is classified according to what the object of classification is.<br>Branch in topology: Where a pipeline is split into topologies, branch refers to a topology branching out from a middle line of Main. (see the detailed description of topology for classification criteria for Main)<br>Branch in PSN Type: Where one PSN is connected to another PSN, branch refers to the case where the meeting point is connected to a middle line of the other PSN. That is, branch in PSN is assigned when the start point or the end point actually meets another PSN line. |
| Difference between order number in topology, PSN order number (0-), and Pathitem ID order number | These three order numbers are entirely different from one another.<br>Order numbers in topology: Order numbers are assigned for each defined type (Main, Branch), Random numbering type<br>PSN Order Number: For the entire topologies constituting the PSN, the order number is assigned sequentially from 0 to the former part according to the fluid flow direction.<br>Order numbers in Path Item ID: Configured by numbering topology ID. However, if the Topology ID changes within the same PSN, a new order number starts. |

The method of processing digitalized drawing data according to an embodiment of the present invention may be executed by a computer. In particular, the method of processing digitalized drawing data includes: providing digitalized drawing having a line ID (S10); splitting the line ID into a plurality of topologies, which are smallest units that are mutually exclusive and do not overlap each other (S20); generating a pipe system network (PSN) by recombining the plurality of topologies, wherein the plurality of topologies are recombined such that a start point and an end point of the PSN are each independently Equipment, Branch or Header (S30); and generating a path item (PI) by arranging internal objects on the digitalized drawing existing between the start point and the end point of the pipe system network (PSN) and adding necessary information usable in a subsequent process (S40).

Figure 3:
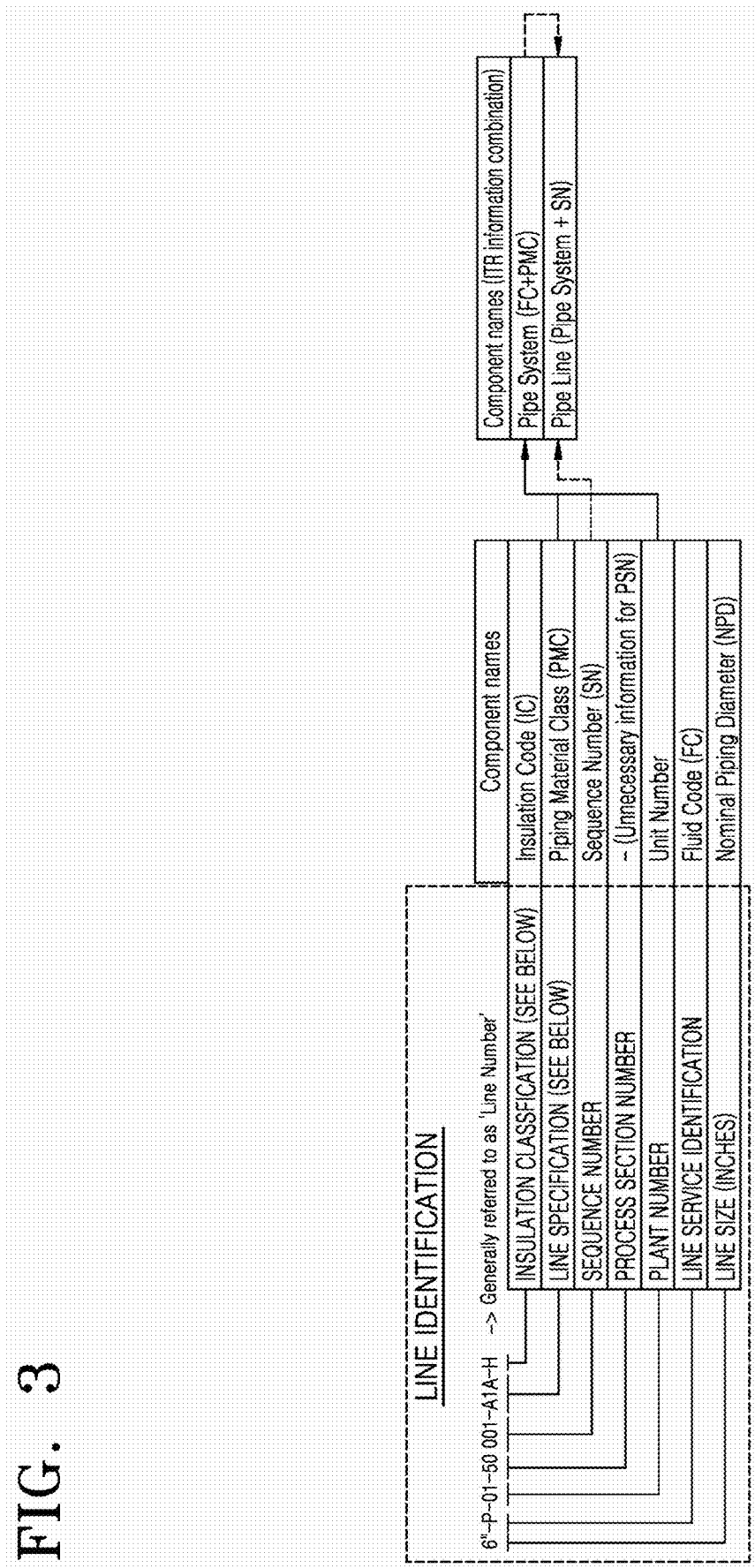
FIG. 3 shows an example of a line ID.

In the step (S10), as illustrated in FIG. 3 showing an example of line ID, the line ID may include fluid code (FC), piping material class (PMC), sequence number (SN), unit number (UN), insulation code (IC), or a combination thereof.

In particular, the step (S20) may include: generating a pipe system (PS) by combining the fluid code (FC) and the piping material class (PMC) (S20-1); generating a pipe line (PL) by combining the pipe system (PS) and the sequence number (SN) (S20-2); generating a topology by combining the pipe line (PL) and the insulation code (IC) and classifying the resultant by the unit number (UN) (S20-3), adding a sub-type tag to the topology generated in the step (S20-3) according to a predetermined standard (S20-4); and classifying the topology generated in the step (S20-4) as main or branch according to a predetermined standard (S20-5).

The unit number (UN), as defined in Table 1, refers to a number assigned according to a specific purpose (process separation, geographical space segmentation, etc.).

An example of the configuration of the pipe system (PS) in the step (S20-1) is illustrated in FIG. 4.

An example of the configuration of the pipe line (PL) in the step (S20-2) is illustrated in FIG. 5.

In the step (S20-2), the start point and the end point of the pipe line (PL) may be connected to equipment (Equipment) or line break (LB) or may be self-terminated without being connected to anything. In other words, the start point and the end point of the pipeline (PL) may be distinguished from another pipeline (PL) by equipment (Equipment) or line break (LB).

Also, in the step (S20-2), the sequence number (SN) is a number assigned to distinguish lines from each other in the digital drawing, and may generally be a single number or a combination of numbers and letters (see Table 1).

In the step (S20-5), if a plurality of main topologies or branch topologies exist in the same pipeline (PL), the number at the end of each tag may be increased by one such as main (Mi) (i=0 or a positive integer) and branch (Bi) (i=a positive integer).

Also, in the step (S20-5), among the topologies, those connected to equipment are first classified as main, and among the topologies that are not connected to equipment, one of lines whose sub-type is Normal may be randomly classified as Main while the other topologies are classified as Branch.

The sub-type tags may be Normal, Instrument, Vent_Drain, By-pass, Header, or Other system.

Figure 6:
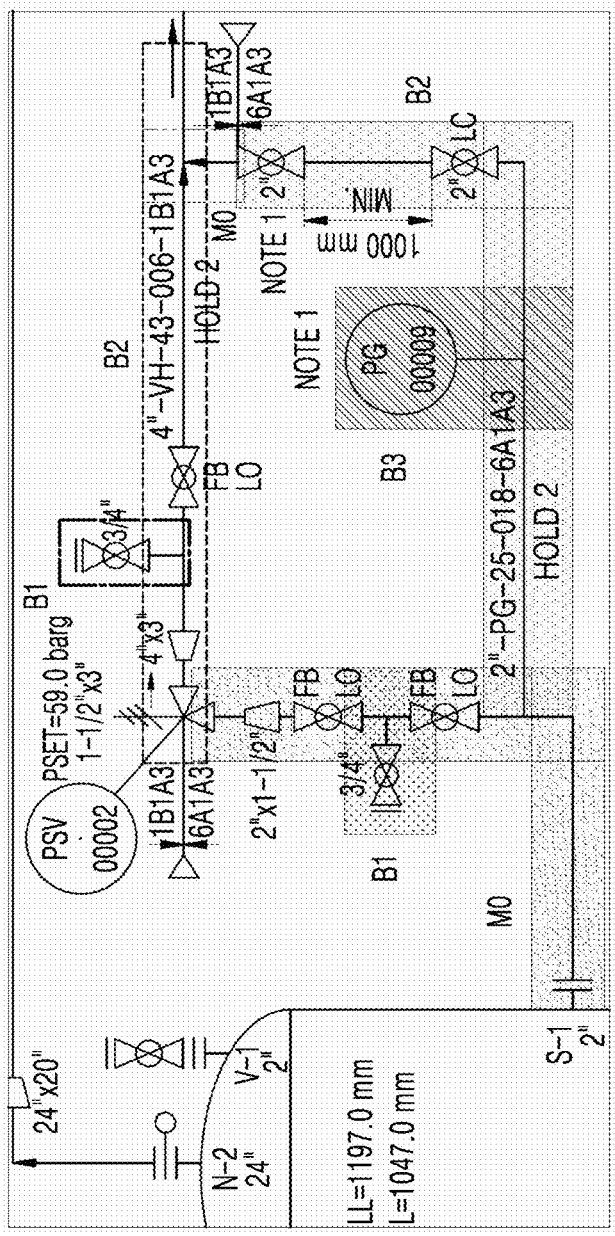
FIG. 6 shows an example configuration of a topology.

Hereinbelow, with reference to FIG. 6 illustrating an example configuration of topologies, the process of generating the pipe system (PS) in the step (S20-1), the process of generating the pipeline (PL) in the step (S20-2), and the process of generating the topologies from the step (S20-3) to the step (S20-5) will be described in detail.

First, the pipe system (PS) is generated by combining the fluid code (FC) and the piping material class (PMC). As a result, two pipe systems (PS) denoted as 'PG-6A1A3' and 'VH-1B1A3' are obtained.

Next, the pipe line (PL) is generated by combining the pipe system (PS) and the sequence number (SN). As a result, two pipe lines (PL) denoted as 'PG-6A1A3-019' and 'VH-1B1A3-007' are obtained.

Next, the pipe line (PL) and the insulation code (IC) are combined and the resultant is classified by the unit number (UN) and then classified as main or branch, to thereby generate topologies. However, in the example configuration illustrated in FIG. 6, there is no insulation code (IC) and therefore, insulation code (IC) is not reflected in the topologies. As a result, seven topologies are obtained, namely, 'PG-6A1A3-019-M0', 'PG-6A1A3-019-B1', 'PG-6A1A3-019-B2', 'PG-6A1A3-019-B3', 'VH-1B1A3-007-M0', 'VH-1B1A3-007-B1', and 'VH-1B1A3-007-B2'. In particular, the sub-type of 'PG-6A1A3-019-M0' is Normal, the sub-type of 'PG-6A1A3-019-B1' is Vent_Drain, the sub-type of 'PG-6A1A3-019-B2' is Normal, the sub-type of 'PG-6A1A3-019-B3' is Instrument, the sub-type of 'VH-1B1A3-007-M0' is Normal, the sub-type of 'VH-1B1A3-007-B1' is Vent_Drain, and the sub-type of 'VH-1B1A3-007-B2' is Normal.

In the step (S30), the pipe system network (PSN) may be configured according to the following standards.

As an example, when a component other than a pipe run of the first topology and a pipe run of the second topology meet, the topologies are connected to each other to configure a single pipe system network (PSN).

As another example, even when a pipe run that is an end point of the first topology and a pipe run that is a start point of the second topology meet, the topologies are connected to each other to configure a single pipe system network (PSN).

As another example, when a pipe run that is an end point of the first topology and a pipe run that is an intermediate point of the second topology meet, the topologies are not connected to each other and each topology configures a separate pipe system network (PSN).

Hereinbelow, with reference to FIG. 7, the process of configuring a pipe system network (PSN) will be described in detail.

Figure 7:
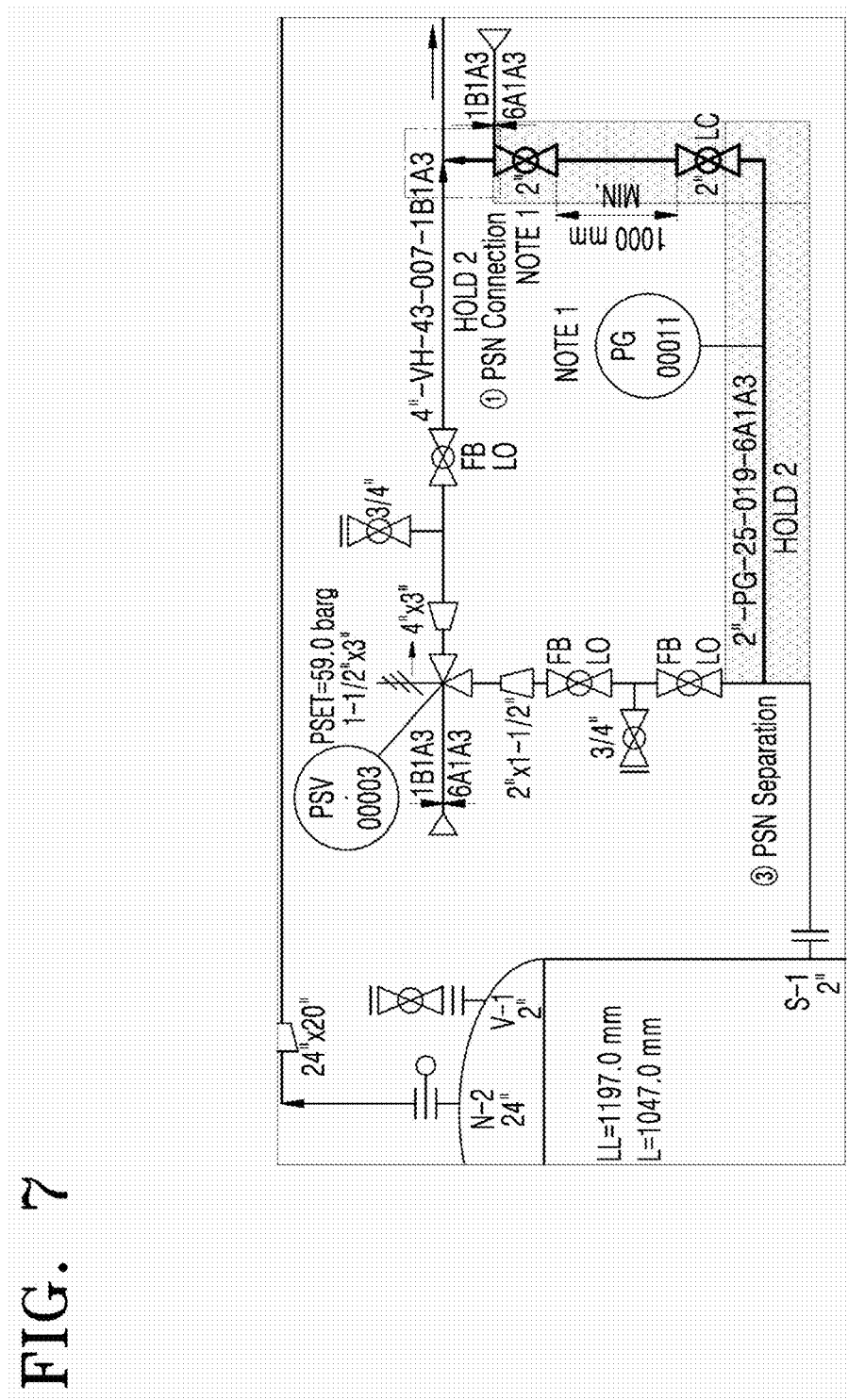
FIG. 7 illustrates a process of configuring a pipe system network (PSN).

Referring to FIG. 7 with FIG. 6, since the end point of 'PG-6A1A3-019-B2' is "Zero Length" (this is a micro-connection point and corresponds to a pipe run in a broad sense, but it is distinguished from a normal pipe run in that it has no length), and the start point of 'VH-1B1A3-007-M0' is a pipe run, these topologies are connected to form one pipe system network (PSN) (see '①  PSN connection'). However, since the start point of 'PG-6A1A3-019-B2' is a pipe run, which meets the middle of a pipe run which is the middle of 'PG-6A1A3-019-M0', these topologies are not connected, but each topology configures a separate pipe system network (PSN) (see '③ PSN separation').

Figure 10:
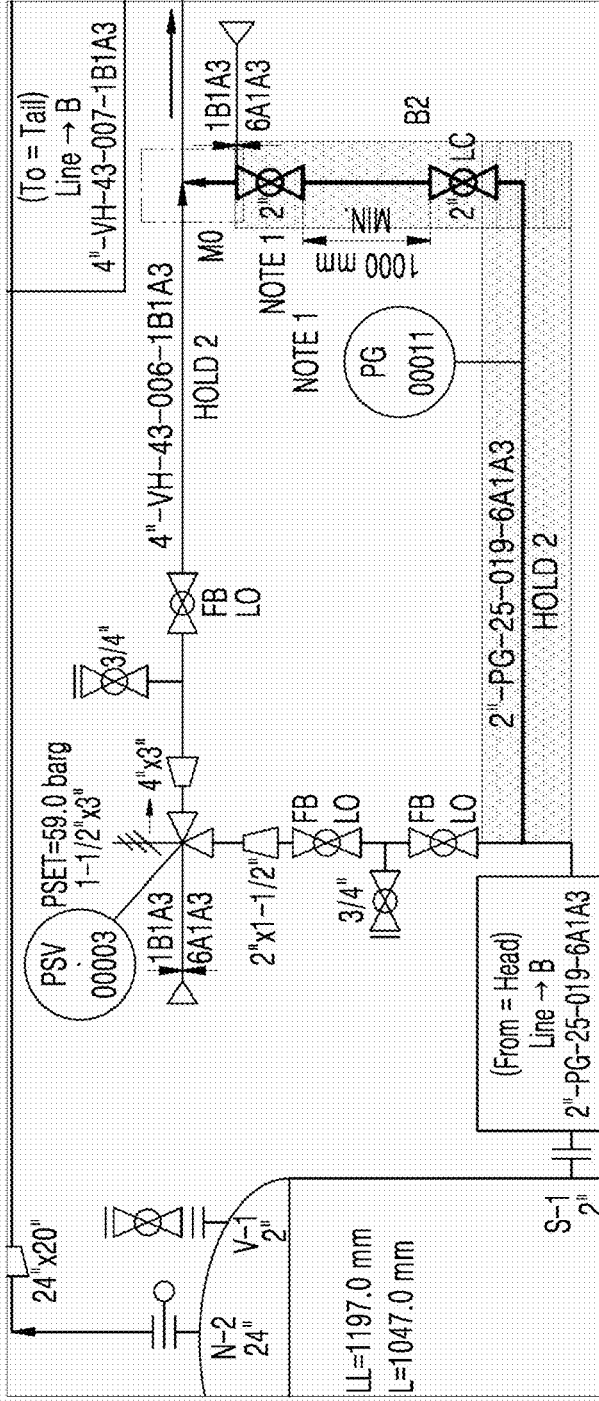
FIG. 10 shows another example configuration of a pipe system network (PSN).

In the step (S30), when configuring the pipe system network (PSN), the topologies whose sub-type is Instrument or Vent_Drain may not be used (see FIG. 10 and relevant descriptions in the description).

In addition, the method of processing digitalized drawing may further include, between the step (S30) and the step (S40), the step of adding a type tag to the pipe system network (PSN) (S32), wherein the type tag may include equipment-to-equipment (E2E), equipment-to-branch (E2B), branch-to-equipment (B2E), branch-to-branch (B2B), header-to-equipment (HDE), header-to-branch (HDB), or header-to-header (HD2).

Figure 8:
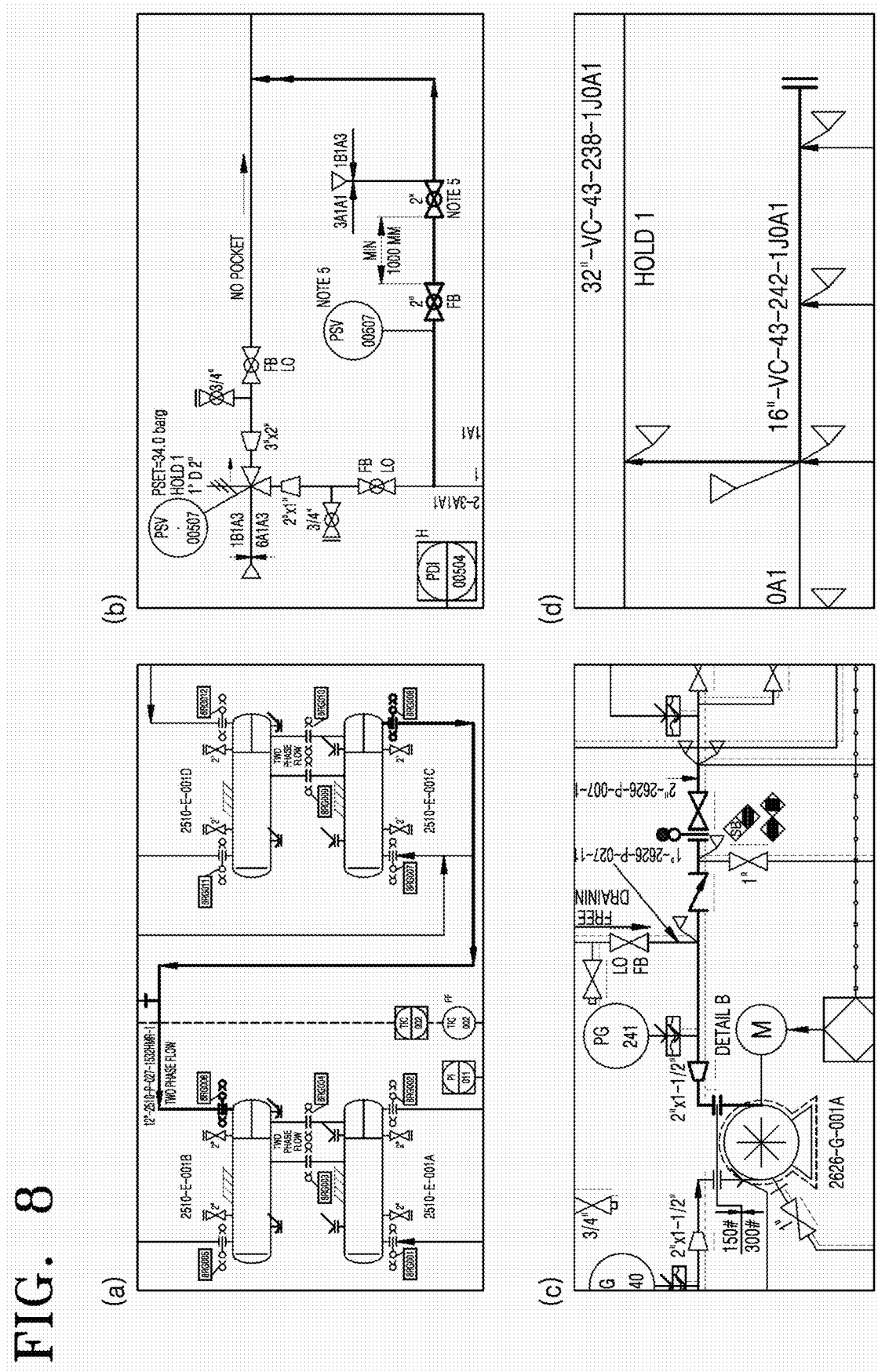
FIG. 8 shows 4 types of pipe system network (PSN).

FIG. 8 shows 4 types of pipe system network (PSN).

Referring to FIG. 8, (a) represents a case in which the type of the pipe system network (PSN) is equipment-to-equipment (E2E), (b) represents a case in which the type of the pipe system network (PSN) is branch-to-branch (B2B), (c) represents a case in which the type of the pipe system network (PSN) is equipment-to-branch (E2B), and (d) represents a case in which the type of the pipe system network (PSN) is header-to-branch (HDB).

The method of processing digitalized drawing may further include, between the step (S30) and the step (S40), the step of adding an order number (ON) tag to the pipe system network (PSN) (S34), wherein the order number (ON) tag is added to the pipe system network (PSN) so as to correspond in one-to-one fashion to individual pipelines (PL) in the order from the start point to the end point as much as the number of pipelines (PL) (S34).

Figure 9:
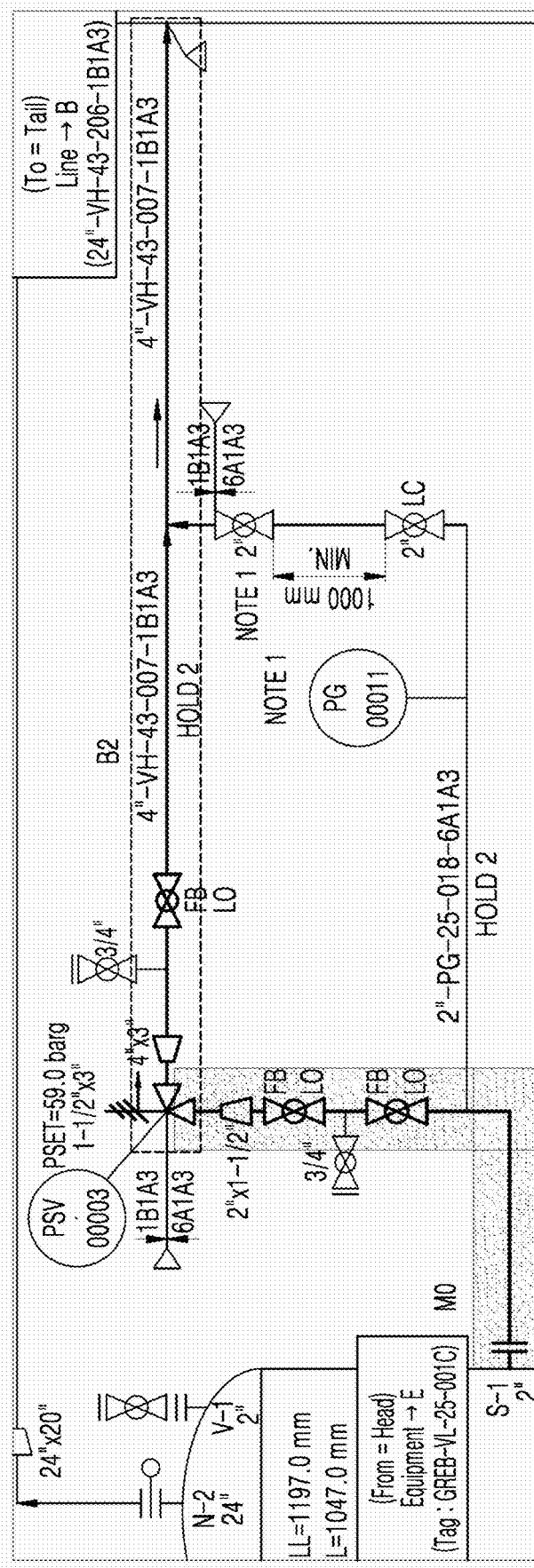
FIG. 9 shows an example configuration of a pipe system network (PSN).

Hereinbelow, with reference to FIG. 9 and FIG. 10 illustrating an example configuration of the pipe system network (PSN), the process of generating the pipe system network (PSN) in the step (S30), the process of adding a type tag to the pipe system network (PSN) in the step (S32), and the process of adding an order number (N tag to the pipe system network (PSN) in the step (S34) will be described in detail.

First, referring to FIG. 9 in conjunction with FIG. 6, a first group of topologies existing on a line whose start point is equipment (E) and end point is branch (B) are grouped together to form one pipe system network (PSN). In particular, the topology denoted as 'PG-6A1A3-019-M0' and the topology denoted as 'VH-1B1A3-007-B2' are grouped together to form a pipe system network (PSN) denoted as 'R002-PSN-00158'. Next, where a type tag is added to the pipe system network (PSN) denoted as 'R002-PSN-00158', since the topology denoted as 'PG-6A1A3-019-M0' is connected to equipment (E) and the topology denoted as 'VH-1B1A3-007-B2' is connected to branch (B), equipment-to-branch (E2B) is added as the type tag. Next, where an order number (ON) tag is added to the pipe system network (PSN) denoted as 'R002-PSN-00158', since two pipe lines (PL) exist in the pipe system network (PSN) denoted as 'R002-PSN-00158', order number (ON) tags "0" and "1" are added, wherein the ON tag "0" corresponding to the head-side pipe line (PL) (PG-6A1A3-019) in the flow direction and the ON tag "1" corresponding to the tail-side pipeline (PL) (VH-1B1A3-007) are added.

Subsequently, looking at FIG. 10 in conjunction with FIG. 6, a second group of topologies existing on a line whose start point is branch (B) and end point is also branch (B) are grouped together to form another pipe system network (PSN). In particular, the topology denoted as 'PG-6A1A3-019-B2' and the topology denoted as 'VH-1B1A3-007-M0' are grouped together to form the pipe system network (PSN) denoted as 'R002-PSN-00633'. Next, where a type tag is added to the pipe system network (PSN) denoted as 'R002-PSN-00633', since the topology denoted as 'PG-6A1A3-019-B2' is connected to branch (B) and the topology denoted as 'VH-1B1A3-007-M0' is also connected to branch (B), branch-to-branch (B2B) is added as the type tag. Next, where order number (ON) tags are added to the pipe system network (PSN) denoted as 'R002-PSN-00633', since two pipe lines (PL) exist in the pipe system network (PSN) denoted as 'R002-PSN-00633', order number (ON) tags "0" and "1" are added, wherein the ON tag "0" corresponding to the head-side pipeline (PL) (PG-6A1A3-019) and the ON tag "1" corresponding to the tail-side pipeline (PL) (VH-1B1A3-007) are added.

In the step (S40), the path item (PI) may be configured by numbering each item name that exists between the start point and the end point in the flow direction of the digitalized drawing.

The item name may include branch (Branch), pipe run (PipeRun), piping component (PipingComp), or in-line instrument (Instrument).

In the step (S40), the path item (PI) may stall with a new order number "0" when the topology (ID) is changed in the same pipe system network (PSN).

The method of processing digitalized drawing data may further include, after the step (S40), the step of adding Branch Topology ID tag to the path item (PI) (S42).

In the step (S42), the Branch topology ID may be denoted as the counterpart topology ID that is not included in the corresponding path item (PI) among two topology IDs connected to the T intersection when two different topologies are branched in a tee (T) shape.

The method of processing digitalized drawing data may further include, after the step (840), the step of adding a pipe system network (PSN) ID tag to the path item (PI) (S44).

In the step (S44), the pipe system network (PSN) ID may be denoted as the ID of the pipe system network (PSN) that includes the counterpart topology that, is not included in the corresponding path item (PI) among two topology IDs connected to the T intersection when two different topologies are branched in a tee (T) shape, and in other cases, the pipe system network (PSN) ID may be denoted as the ID of the pipe system network (PSN) that includes the topology that is included in the corresponding path item (PI).

Figure 11:
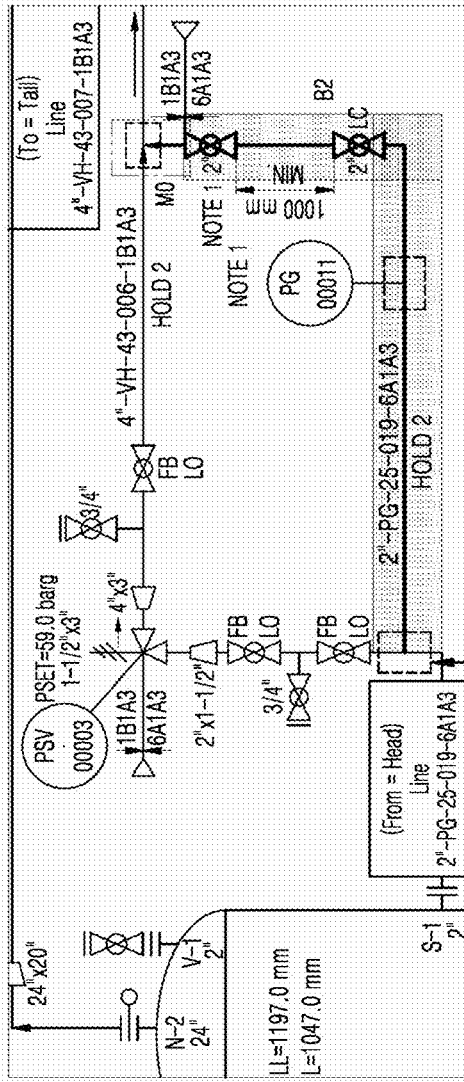
FIG. 11 shows an example configuration of a path item.

Hereinbelow, with reference to FIG. 11 showing an example of the configuration of path item, the process of generating the path item (PI) in the step (S40), the process of adding Branch topology ID tag to the path item (PI) in the step (S42), and the process of adding a pipe system network (PSN) ID tag to the path item (PI) in the step (S44) will be described in detail.

First, referring to FIG. 11 with FIG. 6, the path item (PI) is generated by numbering each of item names existing between the start point and the end point of the pipe system network (PSN) in the flow direction of the digitalized drawing. In particular, between the start point and end point of the pipe system network (PSN) denoted as 'R0000-PSN-00633', there exist the topology denoted as 'PG-6A1A3-019-B2' and the topology denoted as 'VH-1B1A3-007-M0'. In addition, between the start point and end point of the pipe system network (PSN) denoted as 'R0000-PSN-00633', item names are arranged in the order of Branch/PipeRun/Branch/PipeRun/PipingComp/PipeRun/PipingComp/PipeRun/Branch in the topology denoted as 'PG-6A1A3-019-B2', and in the topology denoted as 'VH-1B1A3-007-M0', item names are arranged in the order of Branch/PipeRun/Branch. As a result, the following path items (PI) are obtained: 'PG-6A1A3-019-B2_0', 'PG-6A1A3-019-B2_1', 'PG-6A1A3-019-B2_2', 'PG-6A1A3-019-B2_3', 'PG-6A1A3-019-B2_4', 'PG-6A1A3-019-B2_5', 'PG-6A1A3-019-B2_6', 'PG-6A1A3-019-B2_7', 'PG-6A1A3-019-B2_8', 'VH-1B1A3-007-M0_1' and 'VH-1B1A3-007-M0_2'. Here, since the topology denoted as 'VH-1B1A3-007-M0 comes after the topology denoted as 'PG-6A1A3-019-B2_8', thereby causing the topology ID to change, the topology starts with a new order number "0", such as VH-1B1A3-007-M0_0' instead of 'VH-1B1A3-007-M0_9'.

Next, the branch topology ID tag denoted as 'PG-6A1A3-019-M0' is added to the path item (PI) denoted as 'PG-6A1A3-019-B2_0'. In particular, the start point of the topology denoted as 'PG-6A1A3-019-B2' meets the middle of the topology denoted as 'PG-6A1A3-019-M0' and forms a branch in a tee (T) shape, and to the path item (PI) denoted as 'PG-6A1A3-019-B2_0', which corresponds to this branch, Branch topology ID tag is added. Here, the Branch topology ID being added to the path item (PI) denoted as 'PG-6A1A3-019-B2_0' is 'PG-6A1A3-019-M0', which is the counterpart topology ID that is not included in the corresponding path item (PI) according to a predetermined standard, and this is to indicate to which topology the path item (PI) denoted as 'PG-6A1A3-019-B2_0' is connected, to allow the corresponding data to be utilized in automatic pipe 3D modeling, etc. to be described later.

Next, to the path item (PI) denoted as 'PG-6A1A3-019-B2_0', the pipe system network (PSN) ID denoted as 'R0002-PSN-00158' is added. In particular, the start point of the topology denoted as 'PG-6A1A3-019-B2' and included in the pipe system network (PSN) denoted as 'R0002-PSN-00633' meets the middle of the topology denoted as 'PG-6A1A3-019-M0' and included in in the pipe system network (PSN) denoted as 'R0002-PSN-00158', to form a branch in a tee (T) shape, and to the path item (PI) 'PG-6A1A3-019-B2_0', which corresponds to this branch, the pipe system network (PSN) ID tag is added. Here, the pipe system network (PSN) ID tag being added to the path item (PI) denoted as 'PG-6A1A3-019-B2_0' is 'R0002-PSN-00158', which includes the counterpart topology not included in the corresponding path item (PI) according to a predetermined standard, and this is to indicate to which pipe system network (PSN) the path item (PI) denoted as 'PG-6A1A3-019-B2_0' is connected, to allow the corresponding data to be usable in automatic pipe 3D modeling, etc. to be described later.

Next, to the path item (PI) denoted as 'PG-6A1A3-019-B2_1', the pipe system network (PSN) ID tag denoted as 'R0002-PSN-00633' is added.

Next, the branch topology ID tag denoted as 'PG-6A1A3-019-B3' is added to the path item (PI) denoted as 'PG-6A1A3-019-B2_2'. In particular, the middle of the topology denoted as 'PG-6A1A3-019-B2' meets the start point of the topology denoted as 'PG-6A1A3-019-B3' and forms a branch in a tee (T) shape, and Branch topology ID tag is added to the path item (PI) 'PG-6A1A3-019-B2_2', which corresponds to this branch. Here, the branch topology ID being added to the path item (PI) denoted as 'PG-6A1A3-019-B2_2' is the counterpart topology ID 'PG-6A1A3-019-B3' that is not included in the corresponding path item (PI) according to a predetermined standard.

Here, the pipe system network (PSN) ID tag is not added to the path item (PI) denoted as 'PG-6A1A3-019-B2_2'. This is because the pipe system network (PSN) is not assigned to the topologies whose sub-type tag is Instrument, Vent_Drain, or By-Pass, according to a predetermined standard.

Next, the pipe system network (PSN) ID tag denoted as 'R0002-PSN-00633' is added to the path items (PI) denoted as 'PG-6A1A3-019-B2_3', 'PG-6A1A3-019-B2_4', 'PG-6A1A3-019-B2_5', 'PG-6A1A3-019-B2_6', 'PG-6A1A3-019-B2_7', 'PG-6A1A3-019-B2_8' and 'VH-1B1A3-007-M0_0', respectively.

Next, to the path item (PI) denoted as 'VH-1B1A3-007-M0_1', the pipe system network (PSN) ID denoted as 'R0002-PSN-00633' is added.

Next, the branch topology ID tag denoted as 'VH-1B1A3-007-B2' is added to the path item (PI) denoted as 'VH-1B1A3-007-1410_2'. In particular, the end point of the topology denoted as 'VH-1B1A3-007-M0' meets the middle of the topology denoted as 'VH-1B1A3-007-B2' and forms a branch in a tee (T) shape, and Branch topology ID tag is added to the path item (PI) 'VH-1B1A3-007-M0_2', which corresponds to this branch. Here, the branch topology ID being added to the path item (PI) denoted as 'VH-1B1A3-007-M0_2' is the counterpart topology ID 'VH-1B1A3-007-B2', which is not included in the corresponding path item (PI) according to a predetermined standard.

Next, to the path item (PI) denoted as 'VH-1B1A3-007-M0_2', the pipe system network (PSN) ID denoted as 'R0002-PSN-00158' is added. In particular, the end point of the topology denoted as 'VH-1B1A3-007-M0' and included in the pipe system network (PSN) denoted as 'R0002-PSN-00633' meets the middle of the topology denoted as 'VH-1B1A3-007-B2' and included in the pipe system network (PSN) denoted as 'R0002-PSN-00158', to form a branch in a tee (T) shape, and the pipe system network (PSN) ID tag is added to the path item (PI) which corresponds to this branch. Here, the branch topology ID tag being added to the path item (PI) denoted as 'VH-1B1A3-007-M0_2' is 'R0002-PSN-00158', which includes the counterpart topology not included in the corresponding path item (PI) according to a predetermined standard.

Figure 12:
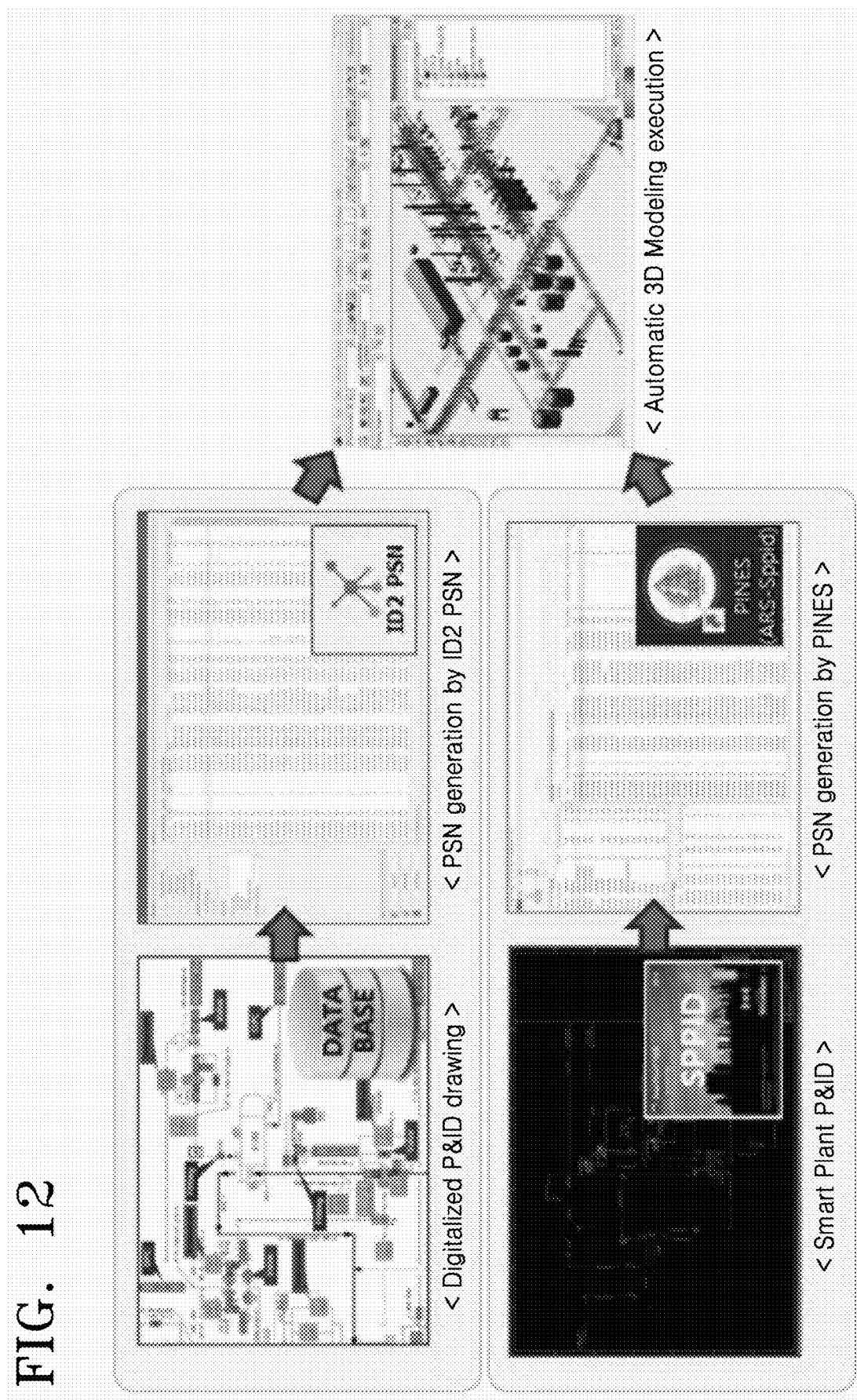
FIG. 12 illustrates an automatic pipe 3D modeling process utilizing a pipe system network (PSN) generated from a digitalized drawing.

FIG. 12 illustrates an automatic pipe 3D modeling process utilizing a pipe system network (PSN) generated from a digitalized drawing. In FIG. 12, "ID2 PSN" refers to a S/W that generates PSN from recognition results of "ID2", which is a drawing recognition S/W, and "PINES" refers to a S/W that generates PSN from SPPID data.

Referring to FIG. 12, as described above, after reading all pipe systems, pipe runs, equipments, nozzles, and other data on a digitalized drawing such as P & ID or Smart Plant P & ID, the data is split into topologies, which are smallest units that do not overlap each other, and the topologies on its own, or by being grouped together, form pipe system network (PSN) data. Then, the data is transferred to a 3D database in an auto pipe routing system, which ultimately can be used in a Smart Plant 3D (SP3D) application for pipe modeling.

The automatic pipe routing system is merely one example of utilizing information organized through the method and system of the present invention, and this organized information can be also utilized in other areas, or for other purposes such as quantity calculation of instruments/valves/fittings, and extraction of necessary information.

Although the present invention has been described with reference to the drawings, these embodiments are merely exemplary, and those skilled in the art shall understand that various modifications and equivalent other embodiments are possible therefrom. Therefore, the full scope of technical protection for the present invention shall be defined by the technical concept of the following claims.

The invention claimed is:
1. A method of processing digitalized drawing data by a computer, the method comprising:
   providing a digitalized drawing having a line ID (S10);
   splitting the line ID into a plurality of topologies, which are smallest units that are mutually exclusive and do not overlap each other (S20);
   generating a pipe system network (PSN) by recombining the plurality of topologies, wherein the plurality of topologies are recombined such that a start point and an end point of the PSN are each independently Equipment, Branch or Header (S30); and
   generating a path item (PI) by arranging internal objects on the digitalized drawing existing between the start point and the end point of the pipe system network (PSN) and adding information usable in a subsequent process (S40),
   wherein in the step (S10), the line ID comprises fluid code (FC), piping material class (PMC), sequence number (SN), unit number (UN), insulation code (IC), or a combination thereof, and
   wherein the step (S20) comprises:
      generating a pipe system (PS) by combining the fluid code (FC) and the piping material class (PMC) (S20-1);
      generating a pipe line (PL) by combining the pipe system (PS) and the sequence number (SN) (S20-2);

generating a topology by combining the pipe line (PL) and the insulation code (IC) and classifying the resultant by the unit number (UN) (S20-3);

adding a sub-type tag to the topology generated in the step (S20-3) according to a predetermined standard (S20-4); and classifying the topology generated in the step (S20-4) as main or branch according to a predetermined standard (S20-5).

2. The method of claim 1, wherein in the step (S20-2), the start point and the end point of the pipe line (PL) may be connected to equipment (Equipment) or line break (LB) or may be self-terminated without being connected to anything.

3. The method of claim 1, wherein in the step (S20-5), if a plurality of main topologies or branch topologies exist in the same pipeline (PL), the number at the end of each tag may be increased by one.

4. The method of claim 1, wherein in the step (S20-5), among the topologies, the topologies connected to equipment are first classified as main, and among the topologies that are not connected to equipment, one of lines whose sub-type is normal is arbitrarily classified as main while the remaining topologies are classified as branch.

5. The method of claim 1, wherein the sub-type tag is Normal, Instrument, Vent_Drain, By-pass, Header, or Other system.

6. The method of claim 5, wherein in the step (S30), when configuring the pipe system network (PSN), the topologies whose sub-type is Instrument or Vent_Drain are not used.

7. The method of claim 1, further comprising, between the step (S30) and the step (S40), the step of adding a type tag to the pipe system network (PSN) (S32) wherein the type tag includes equipment-to-equipment (E2E), equipment-to-branch (E2B), branch-to-equipment (B2E), branch-to-branch (B2B), header-to-equipment (HDE), header-to-branch (HDB) or header-to-header (HD2).

8. The method of claim 7, further comprising, between the step (S30) and the step (S40), the step of adding an order number (ON) tag to the pipe system network (PSN) (S34), wherein the order number (ON) tag is added to the pipe system network (PSN) so as to correspond in one-to-one fashion to individual pipelines (PL) in the order from the start point to the end point as much as the number of pipelines (PL) (S34).

9. The method of claim 1, wherein in the step (S40), the path item (PI) is configured by assigning an order number to each item name existing between the start point and the end point of the pipe system network (PSN) according to the flow direction of the digitalized drawing.

10. The method of claim 9, wherein the item name comprises branch (Branch), pipe run (PipeRun), piping component (PipingComp), or in-line instrument (Instrument).

11. The method of claim 9, wherein in the step (S40), the path item (PI) starts with a new order number "0" when topology is changed in the same pipe system network (PSN).

12. The method of claim 1, further comprising, after the step (S40), the step of adding Branch Topology ID tag to the path item (PI) (S42).

13. The method of claim 12, wherein in the step (S42), the Branch topology ID is denoted as counterpart topology ID that is not included in the corresponding path item (PI) among two topology IDs connected to a T intersection when two different topologies are branched in a tee (T) shape.

14. The method of claim 12, further comprising, after the step (S40), the step of adding a pipe system network (PSN) ID tag to the path item (PI) (S44).

15. The method of claim 14, wherein in the step (S44), the pipe system network (PSN) ID is denoted as the ID of the pipe system network (PSN) that includes counterpart topology ID that is not included in the corresponding path item (PI) among two topology IDs connected to a T intersection when two different topologies are branched in a tee (T) shape, and in other cases, the pipe system network (PSN) ID is denoted as the ID of the pipe system network (PSN) that includes the topology that is included in the corresponding path item (PI).

16. A computer program stored in a non-transitory computer-readable recording medium in order to execute the method of claim 1 by using a computer.

* * * * *